Figure 1:
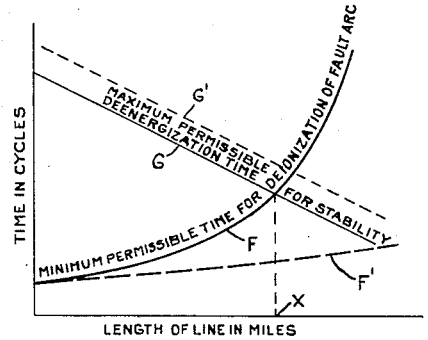

Oct. 2, 1945.  S. B. CRARY  2,386,035
PROTECTIVE SYSTEM
Filed Aug. 27, 1943   2 Sheets-Sheet 1

Inventor:
Selden B. Crary,
by Harry E. Dunham
His Attorney.

Oct. 2, 1945.　　　　　S. B. CRARY　　　　　2,386,035
PROTECTIVE SYSTEM
Filed Aug. 27, 1943　　　　2 Sheets-Sheet 2

Inventor:
Selden B. Crary,
by Harry E. Dunham
His Attorney.

Patented Oct. 2, 1945

2,386,035

UNITED STATES PATENT OFFICE 2,386,035

PROTECTIVE SYSTEM

Selden B. Crary, Schenectady, N. Y., assignor to General Electric Company, a corporation of New York Application August 27, 1943, Serial No. 500,239

7 Claims. (Cl. 175—294)

My invention relates generally to protective systems, and in particular to protective systems for polyphase alternating current circuits employing reclosing single-pole circuit breakers. Specifically, my invention is concerned with means which enable a protective system employing single-pole reclosing circuit breakers to be used for protecting longer sections of lines than was heretofore possible.

In the operation of polyphase alternating current systems and particularly in systems supplying power to synchronous machinery it has been found desirable in certain cases to deenergize only the faulted conductor or conductors when a ground fault occurs thus leaving the remaining conductor or conductors energized to maintain synchronism of the connected machinery. The deenergized faulted conductor is reenergized upon clearing of the fault.

In connection with such polyphase alternating current systems employing single pole switching and reclosing systems, two important elements of time are involved in deenergizing and reenergizing the faulted conductor, namely, deenergization time and deionization time. The deenergization time of the faulted conductor must be sufficiently long so that deionization of the fault arc can take place to make possible safe reenergization by reclosing of the single pole circuit interrupting devices at one or both ends of the line section. The deionization time of a fault arc on a polyphase line section where only a single conductor is deenergized by single pole switching is longer than when all the phase conductors are deenergized by virtue of the capacity currents flowing from the energized phase conductors. It will be obvious that for a sufficiently long line section the capacity currents become so large that the deionization time becomes infinite. On the other hand, the deenergization time of the faulted conductor must be sufficiently short so that the stability of the system is not impaired. Since the maximum permissible deenergization time for stability decreases with the length of the protected line section for a given power flow and the minimum permissible time for deionization of the fault arc increases with the length of the line section being protected, the length of line section which can be protected in this manner is limited. If means were provided to decrease the minimum permissible deionization time or to increase the maximum permissible deenergization time or both, then single-phase switching and reclosing protective systems may be applied to longer line sections than was heretofore thought possible.

Accordingly, it is an object of my invention to provide a new and improved protective system for a polyphase alternating current system comprising a transmission line section or the like of substantial length.

It is another object of my invention to provide a new and improved single-phase switching and reclosing protective system which is applicable for the protection of longer line sections than was heretofore thought possible.

Further objects and advantages of my invention will become apparent as the following description proceeds and the features of novelty which characterize my invention will be pointed out with particularity in the claims annexed to and forming a part of this specification.

Figure 2:
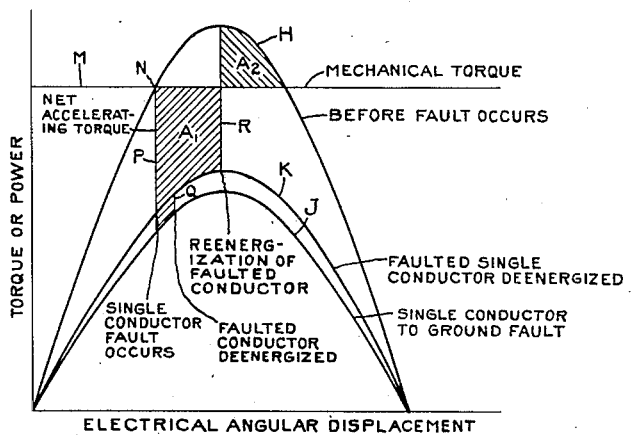
Figure 3:
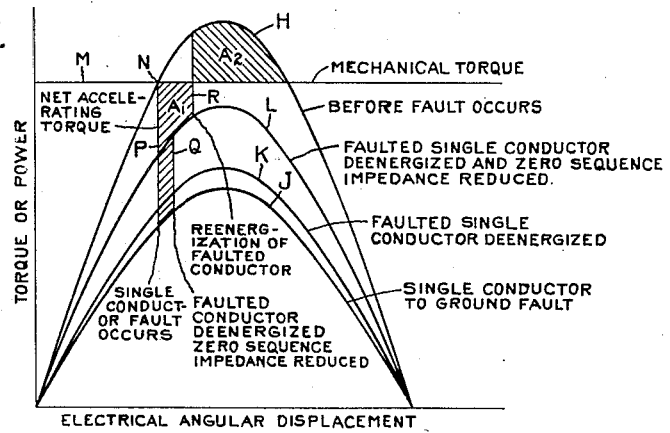
Figure 4:
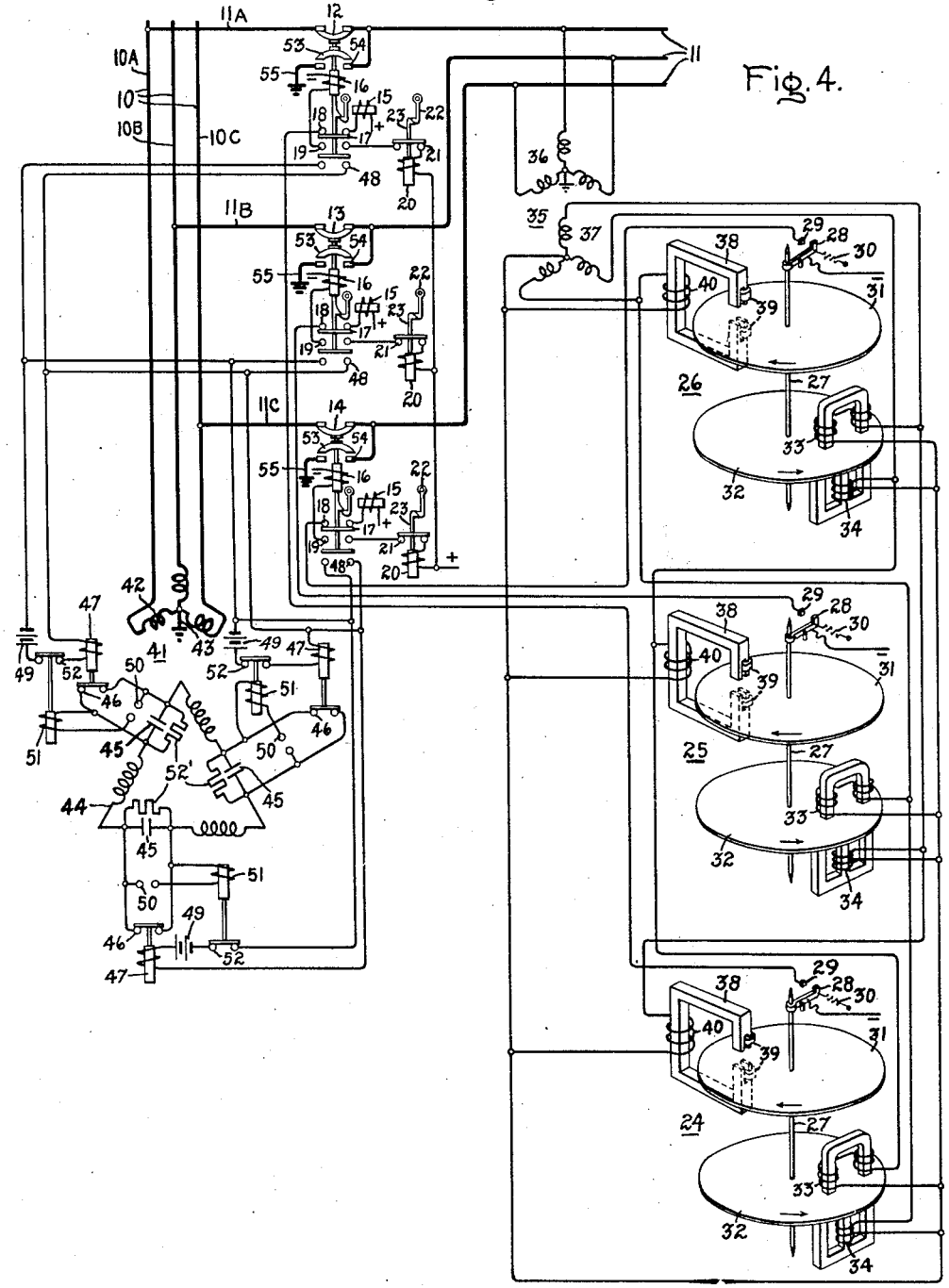

For a better understanding of my invention, reference may be had to the accompanying drawings in which Figs. 1, 2 and 3 are curve diagrams to aid in understanding my invention, and Fig. 4 illustrates diagrammatically an embodiment of my invention as applied to a line section of a polyphase alternating current system.

As was mentioned above, the maximum permissible deenergization time for a line section of a polyphase system from the standpoint of stability, in which a single-phase conductor has been deenergized because of the occurrence of a ground fault thereon, decreases with the length of line for a given power flow, while the minimum permissible time for deionization of the fault arc increases with the length of line. As long as the minimum permissible time for deionization of the fault arc is less than the maximum permissible deenergization time for stability, protective systems including single-phase switching and reclosing arrangements will give satisfactory protection. When the line section to be protected has a length greater than the length X in Fig. 1 at which length the maximum permissible deenergization time equals the minimum permissible deionization time, reenergization of the deenergized conductor cannot be accomplished within a time permitted by the stability limits of the system. If the curve F of Fig. 1 which represents the minimum permissible time for deionization of the fault arc for a fault involving a single conductor of a line section were moved to the position indicated by the dashed curve F' of Fig. 1, then other conditions being equal the same protective system would successfully operate on a system having a longer protected line section and maintain stability thereon for a given power flow. It will be obvious also that if the curve G of Fig. 1, which represents the maximum permissible time a single conductor of a line section may be deenergized and still remain within the stability limits of the system, were moved to coincide with the dashed curve G' the protective system could also be used to protect a longer line section. My invention is particularly concerned with means for accomplishing one or both of these things in order that longer line sections may be protected with my protective system involving single-phase switching and reclosing than was heretofore thought possible.

The curves of Figs. 1, 2 and 3 have been drawn to represent conditions when a single-phase conductor-to-ground fault occurs on the system. These curves have been drawn for the purpose of explaining my invention and are sufficiently accurate for such qualitative analysis even though certain assumptions as will be brought out hereinafter have been made.

To aid in understanding my invention it is desirable to know what the transient power limits of a system are, which may be obtained from torque-angle or power-angle curves. In Figs. 2 and 3 I have illustrated sending end torque-angle curves for various conditions on a system to illustrate the transient power limits. Fig. 2 illustrates such transient power limits on a system not utilizing my invention, while Fig. 3 shows the transient power limits on the same system as in Fig. 2 after my invention has been applied thereto. The curves H, J and K of Figs. 2 and 3 and the curve L of Fig. 3 represent these so-called "torque-angle" or "power-angle" curves for the sending end of a system. In these curves the synchronizing torque or power is plotted against the electrical angular displacement between the two ends of the system. Since it is assumed that the system operates substantially at synchronous speed, torque and power are synonymous insofar as Figs. 2 and 3 are concerned. These curves have been drawn as the sending end power-angle curves and it will be observed that the curve H represents the conditions which normally exist on the system with no fault thereon. The curve J represents the sending end power-angle curve when a single conductor-to-ground fault exists on the system. The sending end power-angle curve K is drawn for the situation when the faulted phase conductor is switched out of service. The curves H, K and J are identical in Figs. 2 and 3. The curve L of Fig. 3 represents the sending end power-angle curve when the faulted conductor is deenergized and in addition the zero phase sequence impedance of the system has been reduced considerably. The curve M of Figs. 2 and 3 represents the mechanical torque supplied to the system which it is assumed remains constant. The power-angle curves of Figs. 2 and 3 are drawn on the assumption that resistance losses and saliency effects may be neglected.

Under normal operating conditions of a system represented by the curve H of Figs. 2 and 3, the mechanical torque and the electrical torque are substantially equal so that the system operates at the point N of the curve H of Fig. 2 where the curve M intersects the curve H. Upon the occurrence of a single conductor-to-ground fault the rotor of the sending end synchronous machine, assuming a single equivalent generator, has applied to it an accelerating torque since the operating characteristic of the system moves down along vertical line P to curve J. The length of the line P represents the net accelerating torque available which tends to destroy system stability. This accelerating torque acts to speed up the sending end of the system and the system operating characteristic moves along the curve J until the faulted conductor is deenergized whereupon the operating characteristic moves upwardly along the line Q to the curve K, as indicated in Fig. 2, and then proceeds along curve K until reenergization of the faulted conductor occurs by reclosing the single pole circuit breakers at both ends of the line section. Upon such successful reclosing the operating characteristic moves along vertical line R from curve K to normal torque-angle curve H. If the area below the line M bounded by vertical lines P, Q and R and the torque-angle curves K and J of Fig. 2 represented by the shaded portion $A_1$ is less than the shaded portion $A_2$ above the line M of Fig. 2 bounded by curve H and vertical line R, then safe reclosing within the stability limits of the system can occur. This so-called "equal area criterion," as will be understood by those skilled in the art, is based on the fact that the area $A_1$ represents an energy quantity for destroying stability of the system and the area $A_2$ represents an energy quantity for restoring stability of the system. So long as the area $A_1$ is less than the area $A_2$ a net energy component for restoring stability is available, and in other words, operation within the stability limits of the system is maintained. It will be obvious from Fig. 2 that the area $A_1$ is greater than the area $A_2$ and consequently the stability of the system cannot be maintained. I have found that with the same line section considered in Fig. 2, if when the faulted conductor is deenergized the zero sequence impedance between the sending and receiving ends of the system is substantially decreased, then the synchronizing power is increased and the torque-angle curve for this condition is represented by the curve L of Fig. 3. With the fault and the deenergization of the faulted conductor occurring as in Fig. 2 the operating characteristic of the system moves from curve J in Fig. 3 directly along vertical line Q to curve L. Since the line Q in Fig. 3 is considerably longer than the line Q in Fig. 2, more of the net accelerating torque is dissipated so that the operating characteristic of the system will move a shorter distance along curve L of Fig. 3 than along curve K of Fig. 2 by the time reenergization of the conductor occurs. Upon such reclosing the momentum will carry the operating characteristic along the curve H and if the area $A_2$ is greater than the area $A_1$ it will move back again to the point N as the system settles down to normal conditions after the fault has been cleared.

By a comparison of Figs. 2 and 3 which represent electrical conditions on the same system, it will be observed that stable operation can be obtained by decreasing the zero sequence impedance of the system during the time that the faulted conductor is deenergized, and consequently the maximum permissible deenergization time for stability has been increased. In other words, the curve G of Fig. 1 may be considered to apply to the system as operated in Fig. 2, while the curve G' applies to the same system when the zero sequence impedance is reduced at the same time the faulted conductor is deenergized to produce the conditions represented by Fig. 3.

In order to illustrate my invention, I have chosen in Fig. 4 to show a polyphase alternating current system provided with means for single-phase switching and reclosing in accordance with the disclosure of the copending joint application of Oliver C. Traver and Andrew J. McConnell, Serial No. 475,492, filed February 11, 1943, and assigned to the same assignee as the present application.

Referring now to Fig. 4 of the drawings, I have illustrated my invention in connection with a polyphase alternating current system specifically illustrated as comprising a three-phase circuit 10 including phase conductors 10A, 10B and 10C respectively. Connected to circuit 10 I have illustrated the protected polyphase alternating current circuit 11 comprising phase conductors 11A, 11B and 11C. Circuit 11 is connected to circuit 10 through single pole circuit interrupters 12, 13 and 14. Each of the circuit interrupters 12, 13, 14 are adapted for single pole switching and are schematically illustrated as latched closed circuit breakers having a trip coil 15, a reclosing coil 16 and an auxiliary switch 17 which is adapted to bridge "a" contacts 18, which are closed when the circuit breaker is closed and "b" contacts 19 which are closed when the circuit breaker is open.

Since my invention is not primarily concerned with the single pole switching and reclosing control circuits including the electroresponsive devices or selector relays which will cause operation of the proper circuit breaker 12, 13 or 14 upon the occurrence of a single line-to-ground fault on one of the conductors of circuit 11, I have simplified the disclosure in regard to the reclosing control circuits by illustrating them as designed to permit one opening and reclosing of the circuit breakers so that any subsequent opening thereof will cause the circuit breaker to lock out. It will be obvious to those skilled in the art that any of the well known control circuits for the circuit breakers 12, 13 and 14 may be provided. For example, a control circuit may be provided whereby the circuit breakers 12, 13 or 14 upon the occurrence of a line-to-ground fault, will open and reclose a plurality of times say, for example, three times, after which the circuit breaker will lock out. This is based upon the assumption that if a plurality of successive openings of the reclosing circuit breaker does not clear a fault, a permanent fault is indicated. In addition, it will also be understood by those skilled in the art that a fault involving more than one phase conductor may be permitted to cause simultaneous operation of all of the circuit breakers. In Fig. 4, however, I have merely illustrated each circuit breaker as provided with a lockout relay 20 having normally closed contacts 21. Whenever any one of the circuit breakers 12, 13 or 14 opens, the corresponding switch 17 closes "b" contacts 19 to energize lockout relay 20. However, simultaneously with the energization of lockout relay 20, the corresponding reclosing coil 16 is energized to initiate immediate reclosure of the single pole breaker which has been opened. It will be understood that lockout relay 20 must delay opening its contacts 21 until the controlled circuit breaker is latched closed. When lockout relay 20 has been operated, a latch 22 will engage a cooperating hook-shaped member 23 so that subsequent openings of the circuit breaker after the first opening, will not permit reclosing of the breaker which will remain locked out. As illustrated schematically in the drawings, the lockout relay 20 must be manually reset, but it will be obvious to those skilled in the art that automatic resetting means could be provided which causes resetting thereof after a predetermined time delay. Also if a plurality of openings and reclosures of the circuit breaker are desired prior to lockout thereof, this may be accomplished by the well-known form of notching relay so often employed in reclosing circuit breaker control systems. Although only the single pole circuit breakers 12, 13 and 14 at one end of the line or circuit 11 are shown, it will be understood that identical circuit breakers will be provided at the other end of line 11, not shown.

It has been discovered that many of the well-known electroresponsive devices such as impedance relays, current relays, voltage relays and the like, do not operate satisfactorily to correctly pick out the faulted conductor and cause operation of the single-pole circuit breaker to deenergize such conductor under all conditions. It has furthermore been discovered that an electroresponsive device which is energized from the protected circuit in such a manner so as to be responsive to a controlling influence tending to cause the electroresponsive device to operate in response to a torque proportional to the area of the triangle determined by two vectors having a common origin representing two voltage quantities of said protected circuit and the tendency to operate is opposed by a restraining torque proportional to a function of another voltage quantity of said circuit that the correct circuit breaker is operated under all single line-to-ground fault conditions. Under double line-to-ground fault conditions, the unfaulted conductor is not deenergized if that is desirable.

Accordingly, I have illustrated a plurality of electroresponsive devices designated generally as 24, 25 and 26 which control the operation of circuit breakers 12, 13 and 14, respectively. Since these electroresponsive devices are identical, only one of them will be described hereinafter and the corresponding parts of all of them will be designated by the same reference numerals.

Electroresponsive devices 24, 25 and 26 may be any of the well-known types of relays as far as general structure is concerned, which have a movable member to which a plurality of torques are applied. For example, it may be of the induction disk type of relay illustrated in Fig. 4. As will be understood by those skilled in the art, the operating and restraining torques applied to the movable member of an induction disk type of relay, may be applied to a single disk, or as illustrated in Fig. 4, may be applied to separate disks mounted on a common shaft. Accordingly, in Fig. 4 electroresponsive devices 24, 25 and 26 are illustrated as each comprising a rotatable shaft 27 which in turn controls a movable contact controlling member 28 adapted to engage a contact 29. Contact 29 and contact controlling member 28 are connected in series with the trip coil 15 of the associated single-pole circuit breaker and the "a" switch contacts 18 which comprise the trip circuit of that circuit breaker. A suitable spring 30 may constantly bias rotatable shaft 27 in such a direction as to move control member 28 away from contact 29 or, in other words, tend to maintain the trip circuit in the open condition.

In order to apply torques to rotatable shafts 27 of electroresponsive devices 24, 25 or 26, I have provided each of the shafts 27 with a plurality of disks 31 and 32 rigidly attached thereto. An operating torque for causing contact 29 to be engaged by contact controlling member 28 in response to a predetermined torque condition on circuit 11 is obtained by means of an operating circuit which controls the energization of a motor element comprising a magnetic structure of the well-known wattmeter type having windings 33 and 34 arranged so as to produce a torque on disk 32 proportional to the area of the triangle determined by two predetermined voltage vectors of circuit 11 having a common origin. It will be obvious to those skilled in the art that a torque proportional to the area of a triangle may be obtained from a wattmetric element energized by two electrical quantities which may be vectorially represented by two vectors having a common origin which torque will be equal to the product of these two vector quantities multiplied by the sine of the angle between them, or in other words proportional to the area of the triangle determined by said vector quantities having a common origin.

It has been discovered that if the motor element associated with disk 32 of each of the electroresponsive devices 24, 25 and 26 is energized with the line to neutral voltage quantities of circuit 11 when combined with the restraining torque motor element to be described hereinafter that proper operation thereof will result. Accordingly I provide potential transformer 35 having a Y-connected primary winding 36 connected to circuit 11. Potential transformer 35 is also provided with a Y-connected secondary winding 37 for energizing electroresponsive devices 24, 25 and 26. The windings 33 of electroresponsive device 26 and the winding 34 of electroresponsive device 25 are energized with a potential proportional to the line to neutral potential of phase conductor 11a, while the winding 34 of electroresponsive device 26 and the windings 33 of electroresponsive device 24 are energized with a potential proportional to the line to neutral potential of phase conductor 11b. Also the windings 33 of electroresponsive device 25 and the winding 34 of electroresponsive device 24 are energized with a potential proportional to the line to neutral potential of phase conductor 11c. With this arrangement electroresponsive device 24 under normal unfaulted conditions has an operating torque impressed thereon in a direction indicated by the arrow on disk 32.

In order to prevent undesirable operation of electroresponsive devices 24, 25 and 26 I provide means for impressing on movable element 27 a restraining torque and I have found that if this restraining torque is made proportional to the square of the line to neutral voltage of the conductor which the particular electroresponsive device is designed to deenergize, that correct single pole switching operation may be obtained. Accordingly, each of the electroresponsive devices 24, 25 and 26 is provided with a motor element comprising a magnetic structure 38 including a pair of shaded poles 39 disposed in spaced relationship to form an air gap therebetwen within which induction disk 31 is adapted to move. Magnetic structure 38 is provided with a winding 40 which is energized with a potential proportional to the line to neutral potential of the phase conductor the energization or deenergization of which the particular electroresponsive device is designed to control. Accordingly, winding 40 of electroresponsive device 24 is energized with a potential proportional to the line to neutral potential of phase conductor 11a, so as to produce a torque in the direction of the arrow indicated on disk 31 proportional to the square of the line to neutral voltage.

The protective system of Fig. 4 described thus far is not my invention, but is disclosed and claimed in the above mentioned copending application. Insofar as my invention is concerned, the protective system described thus far deenergizes the faulted conductor whenever a single conductor-to-ground fault occurs and reenergizes the conductor after a brief time delay. Since it is desirable for both ends of the line 11 to be disconnected at the same time, it will be understood that suitable means, such as carrier current relaying means or the like, would be provided to insure that both ends of the faulted conductor are disconnected from the associated circuits which is embodied in the terms expressed in this specification relating to reenergization and deenergization.

As has been pointed out above, if the zero sequence impedance of the system is reduced the synchronizing torque or synchronizing power for maintaining stability is increased during the time that the faulted conductor is deenergized. In order to decrease the zero sequence impedance upon deenergization of the faulted conductor, I provide a grounding transformer generally indicated at 41 having a Y-connected primary winding 42 connected to polyphase circuit 10. The neutral of the Y-connected winding 42 is grounded at 43. Grounding transformer 41 is provided with a delta-connected secondary winding 44 and upon the occurrence of a single conductor-to-ground fault on the system zero sequence currents will circulate in the delta winding 44. In order to reduce the zero sequence impedance I provide in each leg of the delta winding 44 a capacitor 45 which is normally short circuited by the contacts 46 of a suitable relay 47. Upon opening of the contacts 46 the capacitors 45 are inserted into the circuit so as to compensate either completely or in part for the zero sequence reactance of the circuit, whereby the zero sequence impedance is reduced with the consequent result that the stability limits of the system are increased. In order that the capacitors 45 may be connected in the circuit to reduce the zero sequence impedance of the circuit only when the faulted conductor is deenergized, each of the circuit breakers 12, 13 and 14 is provided with an additional set of normally open contacts 48 which are closed when the particular reclosing circuit breaker is opened. These contacts are all connected in parallel with each other and in parallel with the windings of all of the relays 47. Suitable sources of potential 49 are included in this circuit so that whenever any one of the reclosing circuit breakers 12, 13 or 14 opens to deenergize the associated conductor which is faulted, all of the relays 47 are energized so that all of the capacitors 45 are rendered effective for decreasing the zero sequence impedance of the system. It should be understood that the capacitors 45 may be provided with the conventional protective equipment such as the arc gap 50 and the relay 51 connected in series with the arc gap 50 so that if too high a voltage exists across any of the capacitors the particular relay 51 will be energized to open its contacts 52 whereupon the corresponding relay 47 will be deenergized to short circuit or shunt the associated capacitor 45. In addition suitable stabilizing resistors 52' may be connected across each capacitor if desired. In view of the detailed discussion included with Figs. 2 and 3 above, it will be obvious that by means of capacitors 45 the stability limits of the system are considerably increased and the single phase switching and reclosing protective system may be employed on longer lines than was heretofore thought possible. It should furthermore be observed that the capacitors 45 are never connected into the circuit until the faulted conductor has been deenergized so that they will not be called upon to carry fault currents and consequently relatively inexpensive capacitors may be employed.

It should also be understood that means may be provided to change the amount of capacitance inserted in the circuit for neutralizing the zero sequence impedance in the event that a double line-to-ground fault occurs and two faulted conductors are deenergized, since it will be understood by those skilled in the art that the necessary as well as the allowable zero sequence reactance compensation in such a case is greater than when a single conductor-to-ground fault occurs.

It will be observed that with the arrangement described thus far, I have provided means for increasing the maximum permissible deenergization time for stability of the system. In addition, the stability of the system can also be improved by decreasing the minimum permissible time for deionization of the fault arc.

As was pointed out above, in single phase switching protective systems the faulted conductor which is deenergized is capacitively coupled to the other conductors so that the time for deionization of the arc is longer than if all of the phase conductors had been deenergized with the consequent result that the minimum permissible reclosing time of the circuit breaker is increased which effect becomes more pronounced for long lines. I have found that if the faulted conductor is directly connected to ground at one or both ends as soon as it is deenergized the deionization time is considerably reduced. By doing this a low impedance path is provided for the flow of capacity currents which reduces the flow of such capacity currents at the point of fault and consequently reduces the deionization time of the fault arc. Such grounding of the deenergized faulted conductor also provides an advantage analogous to the capacitors 45 described above in that it provides a low impedance path for the ground current, or in other words reduces the zero sequence impedance of the circuit to increase the maximum deenergization time for stability. Accordingly in Fig. 4 each of the circuit breakers 12, 13 and 14 is provided with a conducting member 53 which, upon opening of the associated circuit breaker, is adapted to close contacts 54 to connect the deenergized faulted conductor directed to ground, indicated at 55.

In view of the detailed description included above, the operation of the single-phase switching and reclosing system of my invention will be obvious to those skilled in the art. By grounding the deenergized faulted conductor the deionization time of the fault is decreased and at the same time the zero sequence impedance of the system is increased so that in effect the curves G and F of Fig. 1 become the curves G' and F'. The zero sequence impedance of the system may be further decreased when the faulted conductor is deenergized by inserting the capacitors 45, as described above. It should be understood that the capacitors 45 and the means for inserting them in the circuit may be used in addition to the grounding means 53 or each of these means may be used separately if desired.

It will be obvious that in systems employing a grounding reactor, the zero sequence impedance may be reduced by shorting out the grounding reactor during the time the faulted conductor is deenergized.

While I have described particular embodiments of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States is:

1. A control arrangement for a plurality of single pole circuit breakers respectively connected in series with different phase conductors of a polyphase circuit comprising means responsive to a fault involving a phase conductor of said circuit for opening the single pole circuit breaker in series with the faulted phase conductor, means for reclosing the breaker associated with the faulted phase conductor after a predetermined time interval, and means for grounding the faulted phase conductor during the time the associated reclosing circuit breaker is in the open position.

2. A control arrangement for a plurality of single pole circuit breakers respectively connected in series with different phase conductors of a polyphase circuit comprising means responsive to a fault involving a phase conductor of said circuit for opening the single pole circuit breaker in series with the faulted phase conductor, means for reclosing the breaker associated with the faulted phase conductor after a predetermined time interval, and means responsive to the operation of any one of said circuit breakers for decreasing the impedance between the associated phase conductor and ground while the circuit breaker is open.

3. A control arrangement for a plurality of single pole circuit breakers respectively connected in series with different phase conductors of a polyphase circuit comprising means responsive to a fault involving a phase conductor of said circuit for opening the single pole circuit breaker in series with the faulted phase conductor, means for reclosing the breaker associated with the faulted phase conductor after a predetermined time interval, and means responsive to the opening of any of said circuit breakers for decreasing the zero sequence impedance of said circuit while the circuit breaker is open.

4. A control arrangement for a plurality of single pole circuit breakers respectively connected in series with different phase conductors of a polyphase circuit of an alternating current system comprising means responsive to a fault involving a phase conductor of said circuit for opening the single pole circuit breaker in series with the faulted phase conductor, means for reclosing the breaker associated with the faulted phase conductor after a predetermined time interval, and means for increasing the maximum permissible deenergization time of one of said faulted conductors for a given power flow within the stability limits of said system by decreasing the zero sequence impedance of said circuit during the interval that said circuit breaker associated with said one faulted conductor is open.

5. A control arrangement for a plurality of single pole circuit breakers respectively connected in series with different phase conductors of a polyphase circuit comprising means responsive to a fault involving a phase conductor of said circuit for opening the single pole circuit breaker in series with the faulted phase conductor, means for reclosing the breaker associated with the faulted phase conductor after a predetermined time interval, and means responsive to the opening of one of said circuit breakers for grounding the associated conductor during the interval said circuit breaker is open to decrease the minimum permissible deionization time of the arc associated with the faulted conductor.

6. A control arrangement for a plurality of single pole circuit breakers respectively connected in series with different phase conductors of a polyphase circuit comprising means responsive to a fault involving a phase conductor of said circuit for opening the single pole circuit breaker in series with the faulted phase conductor, means for reclosing the breaker associated with the faulted phase conductor after a predetermined time interval, a grounding means including a ground connection for said circuit, and means responsive to the opening of one of said breakers upon the occurrence of a ground fault on the associated conductor for effectively introducing in said grounding means a capacitive reactance to reduce the zero sequence impedance of said circuit during the interval of time that said one circuit breaker is open.

7. A control arrangement for a plurality of single pole circuit breakers respectively connected in series with different phase conductors of a polyphase circuit of an alternating current system comprising means responsive to a fault involving a phase conductor of said circuit for opening the single pole circuit breaker in series with the faulted phase conductor, means for reclosing the breaker associated with the faulted phase conductor after a predetermined time interval, a polyphase grounding bank including a ground connection for said circuit and a capacitor for each phase of said grounding bank, said capacitors when rendered effective being capable of neutralizing a predetermined amount of inductance of said circuit so as to reduce the zero sequence impedance of said circuit, means normally rendering said capacitors ineffective, and means responsive to the opening of one of said breakers upon the occurrence of a ground fault on the associated conductor for rendering said capacitors effective during the interval of time that said one circuit breaker is open to decrease the maximum permissible deenergization time of said conductor associated with said one breaker within the stability limits of said system.

SELDEN B. CRARY.